US012583953B2

(12) United States Patent
Zoz et al.

(10) Patent No.: US 12,583,953 B2
(45) Date of Patent: Mar. 24, 2026

(54) METHOD FOR SEPARATING POLYISOPRENE AND OTHER APOLAR VALUABLE SUBSTANCES FROM VEGETABLE FEEDSTOCK

(71) Applicants: Zoz GmbH, Wenden (DE); Fraunhofer-Gesellschaft zur Förderung der angewandten Forschung eingetragener Verein, Munich (DE)

(72) Inventors: Henning Zoz, Wenden (DE); Hans Ulrich Benz, Wenden (DE); Boje Müller, Rheine (DE); Dirk Prüfer, Münster (DE); Christian Schulze Gronover, Münster (DE); Vincent Benninghaus, Gelsenkirchen (DE); Janina Epping, Münster (DE)

(73) Assignees: Zoz GmbH, Wenden (DE); Fraunhofer-Gesellschaft zur Förderung der angewandten Forschung eingetragener Verein, Munich (DE)

( * ) Notice: Subject to any disclaimer, the term of this patent is extended or adjusted under 35 U.S.C. 154(b) by 928 days.

(21) Appl. No.: 17/784,307

(22) PCT Filed: Dec. 8, 2020

(86) PCT No.: PCT/EP2020/085098
§ 371 (c)(1),
(2) Date: Jun. 10, 2022

(87) PCT Pub. No.: WO2021/116113
PCT Pub. Date: Jun. 17, 2021

(65) Prior Publication Data
US 2023/0069783 A1 Mar. 2, 2023

(30) Foreign Application Priority Data

Dec. 10, 2019 (DE) ..................... 10 2019 133 785.2

(51) Int. Cl.
C08F 36/08 (2006.01)
B01D 15/08 (2006.01)
(52) U.S. Cl.
CPC .............. *C08F 36/08* (2013.01); *B01D 15/08* (2013.01)
(58) Field of Classification Search
None
See application file for complete search history.

(56) References Cited

U.S. PATENT DOCUMENTS

2007/0155861 A1* 7/2007 Chen ......................... C08J 3/226
524/492
2011/0027433 A1 2/2011 Ruf et al.

FOREIGN PATENT DOCUMENTS

DE 10 2007 047 764 4/2009
DE 10 2013 107 279 1/2015

OTHER PUBLICATIONS

Van Beilen Jan B et al.: "Gunyule and Russian dandelion as alternative sources of natural rubber"; Critical Reviews in Biotechnmolgy, CRC Press, Boca Raton, Florida, USA; vol. 27, No. 4, Jan. 1, 2007; pp. 217-231.

(Continued)

*Primary Examiner* — Hayden Brewster
(74) *Attorney, Agent, or Firm* — Gudrun E. Huckett

(57) ABSTRACT

The present invention relates to a method for separating polyisoprene and/or other apolar valuable substances from vegetable feedstock, with a first pretreatment (100) of the vegetable feedstock; a percussive, cutting and/or rubbing mechanical processing (102) of the vegetable feedstock after the pretreatment in a wet phase, during which the polyiso- (Continued)

prene and/or other apolar valuable substances contained in the processed raw plant materials are extracted from the vegetable feedstock; and after the mechanical processing (102), a separation (104) of the polyisoprene and/or the other apolar valuable substances from the wet phase. The invention proposes that, before or during the mechanical processing (102) in the wet phase, an adsorber material (106) be added to the ground product mixture to create a method which makes it possible to obtain polyisoprene and other apolar valuable substances from plants having a low rubber content in a technically simpler manner.

6 Claims, 9 Drawing Sheets

(56)                    References Cited

OTHER PUBLICATIONS

Van Beilen Jan B et al.: "Establishment of new crops for the production of natural rubber"; Trends in Biotechnolgy, Elsevier Publications, Cambridge, GB; vol. 25, No. 11; Nov. 1, 2007; pp. 522-529.

* cited by examiner

METHOD FOR SEPARATING POLYISOPRENE AND OTHER APOLAR VALUABLE SUBSTANCES FROM VEGETABLE FEEDSTOCK

BACKGROUND OF THE INVENTION

The present invention relates to a method for separating polyisoprenes and other apolar valuable substances from vegetable feedstock, with a first pretreatment of the vegetable feedstock, a percussive, cutting and/or rubbing mechanical processing of the vegetable feedstock in a wet phase following the pretreatment, in which polyisoprene and/or other apolar valuable substances contained in the processed vegetable feedstock are extracted from the vegetable feedstock, and a separation of the polyisoprene and other apolar valuable substances from the wet phase following the mechanical processing.

Natural rubber has as a main component a polymerizate of isoprene units, in particular the cis-1,4-polyisoprene. Nowadays, the natural rubber is primarily obtained from the latex of the rubber tree, which however is very labor-intensive and entails long transport routes to the processing facility. In addition, prices vary relatively greatly depending on weather and availability of the raw material in the cultivation countries.

From the publication DE 10 2013 107 279 A1, a method is known for obtaining natural rubber and thus polyisoprene from the root material of dandelion as vegetable feedstock. After a biological decomposition process as a first pretreatment, the root material is exposed to a mechanical comminution process in which the root material is comminuted and the natural rubber is released. In this context, the natural rubber particles are to agglomerate. Subsequently, the biomass contained in the solution can be separated and isolated from the natural rubber agglomerates. It is mentioned only in passing that the mechanical comminution process can be realized with a rotating grinding media mill without detailed information to be found how such a grinding media mill is to be configured.

Up to now, plants with a low rubber contents or with a low-molecular rubber have not been used up to now for obtaining polyisoprene due to the minimal efficiency or the problematic aggregate states of the viscous isoprene product. Such plants are in part cultivated in other cultivation regions than the rubber tree so that, with a broadening of the plant basis for obtaining the raw material, the harvest risk for the rubber demand is lowered. Also, individual rubber-containing plants are already cultivated for other value-added chains in which however the rubber-containing biomass up to now is generated as waste because there are no technical methods to make the natural rubber available economically. In this way, a significant biomass quantity is lost which could be usable with a suitable manufacturing method for the manufacture of polyisoprene. When exploiting natural rubber/polyisoprene from vegetable feedstock, it has been disregarded up to now that the separation of other apolar valuable substances from plants is possible also in the context of a method for processing vegetable feedstock.

Accordingly, it is the object of the present invention to provide a method with which it is possible in a technically simple manner to obtain polyisoprene and other apolar valuable substances from plants with a low rubber contents or with a low-molecular rubber.

SUMMARY OF THE INVENTION

The object is solved for a method of the aforementioned kind in that, prior to or during the mechanical processing in the wet phase, an adsorber material is added to the material mixture to be ground.

The first pretreatment of the vegetable feedstock can consist of boiling, washing, comminuting and/or a chemical and/or biological decomposition of the plants, by means of which the cells of the vegetable feedstock are prepared for the subsequent disintegration by the percussive, cutting and/or rubbing mechanical processing in the wet phase.

With the percussive, cutting and/or rubbing mechanical processing of the vegetable feedstock in a wet phase, the natural rubber is extracted from the surrounding biomass and floats in the liquid phase. In the following, only natural rubber will be mentioned; this means the polyisoprene and/or other apolar valuable substances that are to be separated from the remainder of the biomass of the vegetable feedstock. In this state, the natural rubber has the tendency to agglomerate. The agglomeration process however takes time while the material mixture to be ground must be held available in the containers for the mechanical processing. In this way, the volumes of the devices which are required for processing the vegetable feedstock become larger and more expensive. In addition, it is difficult to find an optimal point in time for terminating the mechanical processing. Possibly, not all of the natural rubber has been extracted yet from the adhering biomass and floated to the surface of the mechanically processed material mixture to be ground and agglomerated with other natural rubber; a termination of the mechanical processing at this point in time would lead to a reduced yield of natural rubber. On the other hand, the termination of the mechanical processing could also be prolonged for too long because already agglomerated natural rubber could be again separated from each other and dissolved by a continued mechanical processing so that in the subsequent separation of the natural rubber from the wet phase it is no longer separable without an unjustifiable expenditure. In the known methods, the processes overlap in an uncontrolled fashion such that, on the one hand, not yet all of the natural rubber has become detached from the surrounding biomass and, on the other hand, already agglomerated natural rubber is already destroyed again due to the continued processing.

This analysis makes clear that it is advantageous to accelerate and promote the detachment of the natural rubber from the surrounding biomass and the agglomeration of the natural rubber during the mechanical processing in the wet phase. Due to the acceleration and promotion of the detachment and agglomeration, the residence time of the material mixture to be ground in the device for mechanical processing in the wet phase is lowered; the latter can therefore be designed smaller and thus less expensive for the same throughput. At the same time, the yield of natural rubber from the processed vegetable feedstock is however also increased because the temporal overlap of still extracting the natural rubber from the biomass and the already beginning destruction of the already formed agglomerates is reduced or even avoided completely. In this way, the optimal point in time for the termination of the mechanical processing of the vegetable feedstock in the wet phase can be more precisely determined, whereby also the method efficiency is increased.

The vegetable feedstock from which the natural rubber is to be extracted can be selected from the group of plant families Apocynaceae, Asteraceae, Euphorbiaceae, Moraceae or crossbreeds with latex plants from the group of

*Agoseris glauca, Apocynum venetum, Chrysothamnus graveolens, Chrysothamnus nauseosus, Chrysothamnus viscidiflorus, Funtumia elastica, Parthenium argentatum, Scorzonera acanthoclada, Scorzonera albicaulis, Scorzonera divaricate, Scorzonera hissaricata, Scorzonera racemosa, Scorzonera tau-saghyz, Scorzonera tragapogonoides, Scorzonera turkestania, Scorzonera virgate, Solidago canadensis scabra, Solidago fistulosa, Solidago leavenworthii, Solidago rigida, Sonchus oleraceus, Taraxacum brevicorniculatum, Taraxacum hybernum, Taraxacum koksaghyz, Taraxacum megalorrhizon, Taraxacum officinale, Cichorium intybus* L., Musaceae, in particular with the species *Musa*, *Ensete*, and *Musella*, or corresponding hybrids. Natural rubber obtained from these plant families or mechanically processed parts of these plants that have been processed such that polyisoprene and other apolar valuable substances can attach are however also suitable as adsorber material.

Apolar synthetic rubbers such as e.g. acrylic rubber (ACM), butadiene rubber (BR), butyl rubber (IIR), chlorosulfonated polyethylenes (CSM)/Hypalon, ethylene propylene diene monomer (EPDM), fluoroelastomers (FKM)/Viton, isoprene rubber (IR), nitrile rubber (NBR), perfluoroelastomer (FFKM), polychloroprenes (CR)/Neoprene, polysulfide rubber (PSR), silicone rubber (SiR), styrene butadiene rubber (SBR) can also be used as adsorber material. Furthermore, plant/animal oils and fats (e.g. safflower oil, peanut oil, hempseed oil, herring oil, pumpkinseed oil, almond oil, corn oil, poppy seed oil, lard, suet, castor oil, sesame oil, soy oil, sunflower seed oil, grape seed oil, walnut oil, wheat germ oil, olive oil, rapeseed oil, palm oil, coconut oil, linseed oil, coconut fat) or mineral oils (e.g. white oil) can be used. Examples of technical adsorbers are Ultra-X-Tex, UltraSorb, and QuickSorb.

The release of the natural rubber from the surrounding biomass and the agglomeration of the natural rubber during the mechanical processing in the wet phase is accelerated and promoted in that during the mechanical processing in the wet phase an adsorber material is added to the material mixture to be ground. In adsorption, the molecules of the natural rubber remain adhered to the surface of the adsorber material and accumulate on its surface. The natural rubber as an adsorbate forms however no chemical bond with the surface of the adsorber material but adheres by weaker forces similar to adhesion. The forces that cause the adhesion are no chemical bonds but only van-der-Waals forces. This form of adsorption is referred to more exactly as physical adsorption or physisorption. In contrast to chemisorption, no chemical reaction between the natural rubber and the adsorber material takes place. The adsorption energy lies within the range of 4 to 40 kJ/mole for physisorption. Chemical bonds within an adsorbed particle remain but are however polarized.

The adsorber material with the adsorbed natural rubber and other accumulated apolar substances can be used as composite isoprene. It is also possible to separate low-molecular isoprene as well as other lipids with conventional methods. The conventional separation methods can be based on thermal, mechanical or chemical action principles.

The adsorption is reversible because the particles can leave the surface again by use of a similar amount of energy that has been released upon adhesion to the surface. These reactions are generally not impaired by transition states. The activation energy of the reaction is therefore the same as the adsorption energy. Adsorbed particles have no fixed binding locations on the surface, do not reside at the location where they have been adsorbed but move freely along the surface.

The position of the equilibrium depends on the properties and size of the surface, the properties and the pressure or the concentration of the adsorbate, as well as on the temperature.

Aside from the adsorption of polyisoprene, also other valuable apolar substances, in particular lipids such as triterpenoids, polyphenols, flavonoids, and unsaturated fatty acids, that are useful for the utilization in the pharmaceutical industry can be adsorbed from vegetable feedstock, as alternative to known extraction with organic solvents or other less environmentally friendly methods. The addition of the adsorber materials thus makes it possible to separate, in addition to the natural rubber, also further valuable ingredients of vegetable feedstock from the material mixture to be ground at the stage of the mechanical processing in the wet phase. Due to the pure adhesion, even the apolar substances can be separated again later on, after the mechanical processing, from the adsorber material and the natural rubber and made available separately with comparatively minimal expenditure.

Due to the addition of the adsorber material to the material mixture to be ground during the mechanical processing in the wet phase, polyisoprene and other valuable lipids can be accumulated and separated with a high efficiency from the vegetable feedstock. In the wet phase, the natural rubber that has been extracted from the surrounding biomass can move more easily toward the adsorber material and adhere thereto. Due to the utilization of the wet phase, the adsorption is thus significantly promoted. No organic solvents are used in the adsorption. As residual material, a wet vegetable sludge is produced that can be used as feed additive, biogas substrate, fertilizer, or for purification of polar substances such as carbohydrates, for example, inulin. The natural rubber accumulated from the vegetable feedstock with the adsorber material can be further processed by means of methods for rubber processing known from the prior art. For example, processing of *Taraxacum kok-saghyz* is extensively described in the patent literature. These processing methods can also be used in order to process the natural rubber adsorbed from the vegetable feedstock together with the respectively employed adsorber material.

When in this description a material mixture to be ground is mentioned, this refers to the vegetable feedstock in the liquid phase that is subjected to the mechanical processing. Even when for reasons of simplification a material mixture to be ground is mentioned, the mechanical processing is in no way limited to purely a mechanical processing by grinding. As alternative or additional mechanical processing actions, for example, also cutting, crushing, or percussive processing actions are conceivable. Accordingly, technically the employed term of grinding media mill in this description is not limited to a mill that grinds exclusively with grinding media. As devices for mechanical processing of the material mixture to be ground in the liquid phase, roller mills, planetary mills, impact mills, cutting mills, planetary roller extruders, double screw extruders or choppers, cutters or shredders, alone or in any arbitrary combination with each other, are also conceivable that are referred to in this description as grinding media mill as a collective term for simplifying matters.

According to an embodiment of the invention, the mechanical processing is carried out in a grinding media mill that is operated in a continuous operation. In contrast to processing in a batch method, a grinding media mill operated in continuous operation provides for a higher throughput, a reduced personnel expenditure, and an improved adaptability of process parameters to changing requirements in regard to the process of mechanical processing. A grinding media mill operating in continuous operation operates fundamentally more efficiently because the periods of interruption required for charging and discharging the devices are obsolete in the mechanical processing. The adsorber material can be supplied well into the milling chamber in a grinding media mill that is operated continuously. In this context, the supplied quantity of the adsorber material can also be adapted easily to the concrete need.

According to an embodiment of the invention, the surface of the adsorber material at which the adsorption is taking place is the surface of a solid or the surface of a liquid, and the adsorber material is an apolar adsorber. A solid or a liquid can be supplied easily to the material mixture to be ground. The adsorber material can be added to the material mixture to be ground already before it is supplied to the milling chamber of the grinding media mill, or it is added to the material mixture to be ground during the mechanical processing in the milling chamber. The apolar adsorber can be substances such as, for example, natural rubber, synthetic rubber, plant or animal oils and fats, or mineral oils or technical adsorbers such as active carbon, graphite or polymer adsorbers.

According to an embodiment of the invention, the solid and/or liquid adsorber material is added continuously to the milling chamber of the grinding media mill. Despite the continuous throughput of a material mixture to be ground, it is ensured due to the continuous addition in the milling chamber that no dilution effect in the concentration of the adsorber material in the material mixture to be ground occurs due to the constant inflow and outflow of the material mixture to be ground in the milling chamber. The proportion of the adsorber material which is contained in the material mixture to be ground can be kept at least approximately constant in the milling chamber so that a continuously high yield of natural rubber is ensured.

According to an embodiment of the invention, the separation of the natural rubber and/or of the adsorber material from the wet phase is realized by mechanical separation methods. For example, screening, a filtration, flotation and/or air separation are conceivable as mechanical separation methods. The mechanical separation methods are inexpensive and reliable.

According to an embodiment of the invention, the mechanical processing of the material mixture to be ground is carried out in the wet phase in a grinding media mill. In case of this concrete embodiment of the invention, the term grinding media mill is limited to precisely this mill type. The grinding media mill can be preferably operated in a continuous operation in that a material mixture to be ground is supplied continuously via the feed device to the drum of the grinding media mill, the material mixture to be ground passes through the milling chamber along the axis of rotation, and is conveyed out of the drum at the end by means of a discharge device. The material mixture to be ground contains at least partially a liquid with which the vegetable feedstock can be conveyed better through the drum and distributed more uniformly within the drum. The liquid is also required in order to enable the natural rubber to agglomerate with each other to flakes after its dissociation from the remainder of the biomass.

Due to the continuous rotational movement of the drum, the grinding media in the respective sections are moved against each other and, following the rotational direction, continuously moved upwardly a bit. In that the grinding media during the continuous movement sheer past the vegetable feedstock present between the grinding media and rub thereon, the latter are decomposed. When the process parameters are adjusted from cascade mode into the cataract mode, the grinding media drop additionally from above on the material mixture to be ground. Due to the impact force acting in this context on the vegetable feedstock, the latter is additionally decomposed. Due to the number of grinding media and the rotational speed of the drum, many impacts result correspondingly in a time interval that act on the vegetable feedstock contained in the sections and by which the cell structure of the vegetable feedstock is decomposed. In this context, the natural rubber that is contained in the vegetable feedstock is released and can float to the top and agglomerate in a flake-type manner in the liquid that forms a component of the material mixture to be ground. As agglomerated flakes, the natural rubber can be separated easily from the remainder of the components of the material mixture to be ground.

When the milling chamber in the drum of the grinding media mill is divided into a plurality of sections, sequential zones in which the vegetable feedstock can be processed with different intensity are provided in the direction of passage of the material mixture to be ground through the drum. Thus, it is possible to provide, for example, in the first section, an intensive processing for an initial decomposition, for example, by an appropriate furnishing of this section with corresponding grinding media while the processing in the subsequent sections can be performed more gently in order to separate the natural rubber from the remainder of the plant components and to promote agglomeration. The drum as a whole comprises a length and a number of sections provided therein that is required for decomposing the vegetable feedstock to such an extent that the natural rubber agglomerates. The sections can be of different length in order to affect also the residence time of the vegetable feedstock in a section in this way. For example, a longer section, in which no or only a few grinding media are present and in which the vegetable feedstock is substantially only moved and rinsed in the liquid of the material mixture to be ground, can adjoin a short section, in which the vegetable feedstock is more intensively acted on by heavy grinding media. The partitions can also be mounted so as to be movable along the axis of rotation in the drum in order to be able to change the length of the sections.

When the partitions comprise passage openings through which the material mixture to be ground can pass from one section into a neighboring section, an automatic flow of the material mixture to be ground through the drum is provided. In particular by supplying a material mixture to be ground to one side of the drum, a flow is produced within the milling chamber with which the material mixture to be ground passes from a section arranged upstream to the next section that is located downstream, respectively, until it reaches the discharge device for discharging the material mixture to be ground that has been processed in the milling chamber. The passage openings are preferably sized such that they retain the grinding media located in a section but the material mixture to be ground can flow through the passage openings. However, individual or a plurality of passage openings can also be designed such that they allow grinding media to pass through. When such passage openings are however arranged farther inwardly displaced toward the axis of rotation at a distance to the outer wall of the sections, the number of grinding media that actually pass through such a passage opening into the neighboring section remains minimal, in particular when in this section only a few grinding media are located. The passage openings can be designed to be adjustable in their size in order to be able to adapt them to different vegetable feedstock and their material properties, or throttle bodies can be placed onto the passage openings based on which differently sized or shaped passage openings result. Passage openings can be designed also as a type of screen in order to qualitatively select also larger components of the vegetable feedstock or contaminants from the material mixture to be ground. The passage openings affect with their shape, position, and size also the throughput quantity and throughput speed of the material mixture to be ground through the drum. They are sized, designed, and positioned such that a throughput speed suitable for decomposition of the vegetable feedstock is reached at which the natural rubber that has been agglomerated to flakes arrives in the last section of the drum or forms therein and can be discharged from there out of the drum.

It can also be provided that the motor is provided with a device by means of which the rotational speed of the drum can be variably adjusted. When the drum rotates faster, more impacts of grinding media on the vegetable feedstock in a time interval occur, at a lower rotational speed the number of impacts in the time interval decreases. The impacts that are exerted by the grinding media on the vegetable feedstock contained in the material mixture to be ground are also of different magnitude depending on the drum rotational speed. Due to the change of the drum rotational speed, the processing intensity of the vegetable feedstock can thus be changed in a targeted fashion. When it is found that the natural rubber during the continuous processing of a material mixture to be ground agglomerate too early, the drum rotational speed can be reduced in order to stretch the agglomeration temporally. In contrast, the drum rotational speed can be accelerated when the natural rubber agglomerates too late. The device for rotational speed change can affect the power that is available for the motor in order to change in this way the rotational speed of the motor with which the drum is driven, or the transmission ratio of the motor rotational speed is changed by a gear box that is arranged between the motor and the drum.

In summary, it is possible with the grinding media mill to design the decomposition of vegetable feedstock in the drum for obtaining natural rubber by a corresponding configuration and adjustment of the afore described variable components of the grinding media mill in such a way that the agglomerated natural rubber is found in the last section of the drum. The decomposition is adjustable gently enough in order to not destroy the natural rubber during the course of processing but also aggressive enough in order to extract the natural rubber from the remainder of the plant components to such an extent that it can agglomerate in the material mixture to be ground. In case of occurring variations in the vegetable feedstock, the grinding media mill can also be adjusted by changes of the changeable process parameters in such a way that even for changed vegetable feedstock the natural rubber can be removed in agglomerated form from the drum. In addition, the agglomeration of the natural rubber is accelerated and promoted by the addition of the adsorber material into the material mixture to be ground.

Further features of the invention result from the claims, the figures, and the subject matter description. All features and feature combinations which have been mentioned above in the description as well as the features and feature combinations mentioned in the following in the figure description and/or illustrated in the figures alone are usable not only in the respectively indicated combination but also in other combinations but also individually.

With the aid of a preferred embodiment as well as with reference to the attached drawings it will be explained in more detail in the following how natural rubber can be extracted from the vegetable feedstock in the context of a mechanical processing in the wet phase.

BRIEF DESCRIPTION OF THE DRAWINGS

It is shown in.

DESCRIPTION OF PREFERRED EMBODIMENTS

Figure 1:
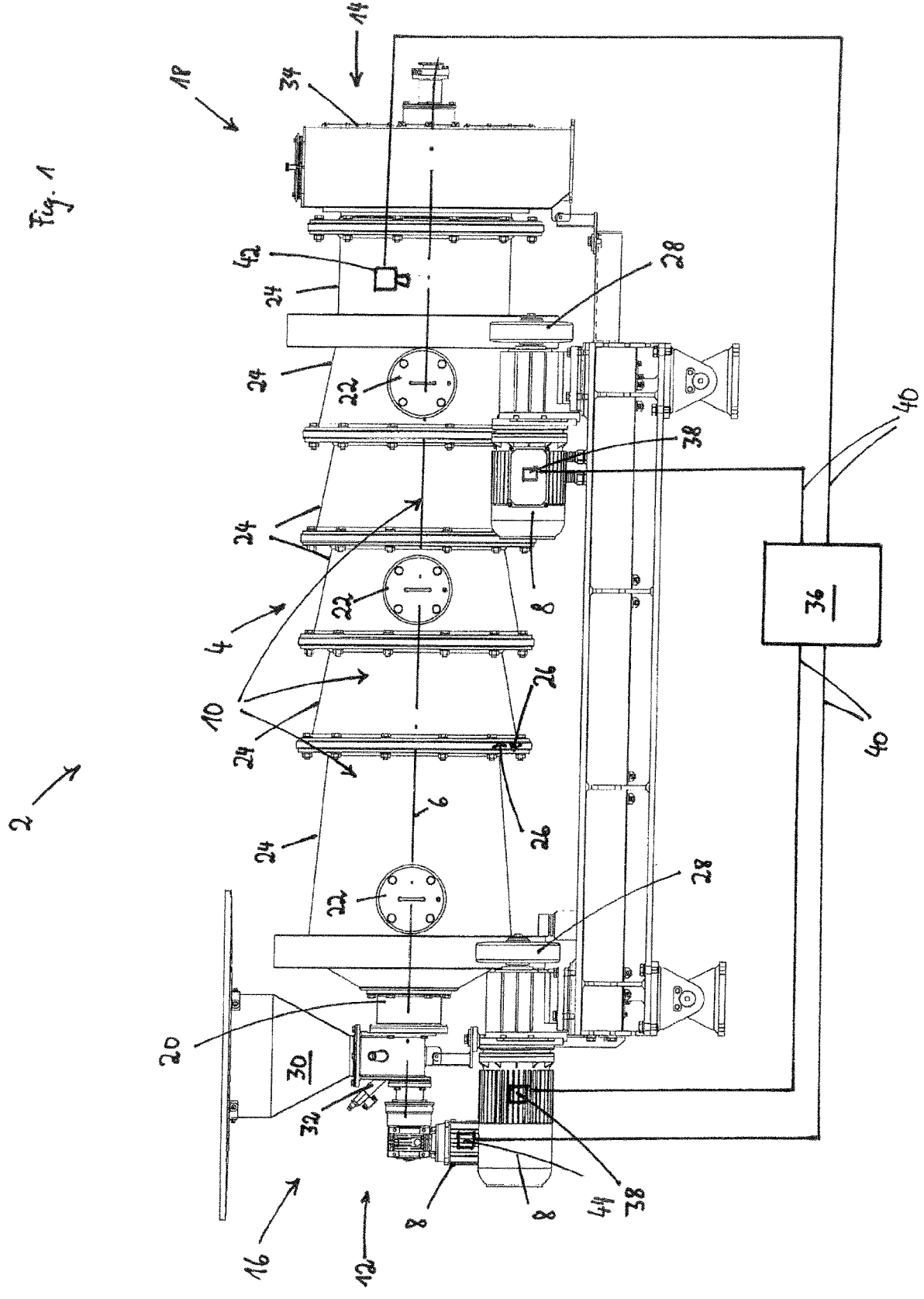
FIG. 1: a side view of a grinding media mill.

In FIG. 1, a side view of a grinding media mill 2 is illustrated. The grinding media mill 2 comprises a drum 4 through which a material mixture to be ground is conveyed in order to extract the natural rubber contained in a vegetable feedstock and to agglomerate the natural rubber so that it can be removed as an agglomerate easily from the material mixture to be ground and separated therefrom.

The drum 4 is rotatably supported about an axis of rotation 6. Axis of rotation 6 can be designed as a real shaft but it can also be provided only by the type and manner of the support of the drum 4. The drum 4 is caused to rotate by the two motors 8 shown in the illustrated embodiment. Within the drum 4, there is a milling chamber 10 in which the material mixture to be ground is worked on by grinding media that are located in the milling chamber 10. The grinding media are not illustrated in the Figures.

The drum 4 comprises a first end face 12 from where the material mixture to be ground is fed into the milling chamber 10. After passing through, the material mixture to be ground exits again from the milling chamber 10 via the discharge device 18 which is located in the region of the second end face 14. The material mixture to be ground is supplied by a separate feed device 16 to the milling chamber 10 through a rotary feedthrough 20. A rotary feedthrough can also be provided in the region of the discharge device 18.

In order to be able to fill grinding media into and remove it again from the milling chamber 10, a number of openings 22 are provided in the wall of the drum 4. The openings 22 can be correlated with a respective section within the milling chamber 10.

In the embodiment, the drum 4 is assembled of a plurality of six pipe segments 24. Each pipe segment 24 comprises a flange surface 26 at the end face that is embodied congruent to the flange surfaces 26 of other pipe segments 24. By a simple positioning of the flange surfaces 26 against each other, arbitrary pipe segments 24 can thus be assembled to a drum 4 in an also principally arbitrary orientation. The pipe segments 24 can have different lengths along the axis of rotation 6 and diameters. The diameters of the pipe segments 24 can also vary across their length in direction of the axis of rotation 6.

In the embodiment, the drum 4 is supported at its outer circumference on rollers 28. The two rollers 28 illustrated in FIG. 1 are driven by the motors 8. In the embodiment, the rollers 28 run along the outer edges of the flange surfaces 26 so that they form a circumferential running surface.

The material mixture to be ground can be supplied to the milling chamber 10 via the feed container 30. For this purpose, the material mixture to be ground is filled from above into the feed container 30. From here, it is then supplied through the rotary feedthrough 20 to the milling chamber 10. In the embodiment, the feed container 30 comprises an additional feed conduit 32 by means of which liquids or gases can be added to the material mixture to be ground. Due to the arrangement of the feed conduit at the feed side of the drum 4, it is possible to additionally liquefy the material mixture to be ground, to loosen it, or to additionally decompose the biological raw materials when the medium conveyed through the feed conduits 32 is introduced at high pressure or at a high temperature into the feed device 16. Thus, the feed conduits 32 can supply, for example, a liquid, which decomposes the cell structures of the vegetable feedstock by mechanical action and/or thermally, through a steam nozzle or a spray valve.

The discharge device 18 can be provided with an end wall 34 that delimits the discharge device 18.

The working processes that are performed by the grinding media mill 2 can be adjusted and controlled by a control unit 36. The control unit 36 is connected to the devices 38 by means of which the rotational speed of the drum 4 can be variably adjusted. The device 38 can be an output regulator for the motor 8. However, also other configurations for the device 38 are possible, for example, a planetary transmission or stepless transmission with which the rotational speed of the drum 4 is variably adjustable.

The control unit 36 is connected by means of corresponding connection lines 40 to the devices 38 as an example of a rotational speed control, the actor 44 as an on-off switch or rotational speed regulator for the feed device 16 as well as a camera 42 as an example of a sensor. The connection lines 40 can be realized as connection cables but there are also other connection types possible, for example, a wireless connection by radio communication, by optical waveguides, or other media for transmitting data.

In the embodiment illustrated in FIG. 1, the drum 4 is supported by a total of four rollers 28 of which the two rollers 28 illustrated in the front are driven by a motor 8, respectively. Depending on the length and weight of the drum 4, additional rollers 28 can be provided also. It is also possible to drive more or only a single roller 28 by a motor.

Figure 2:
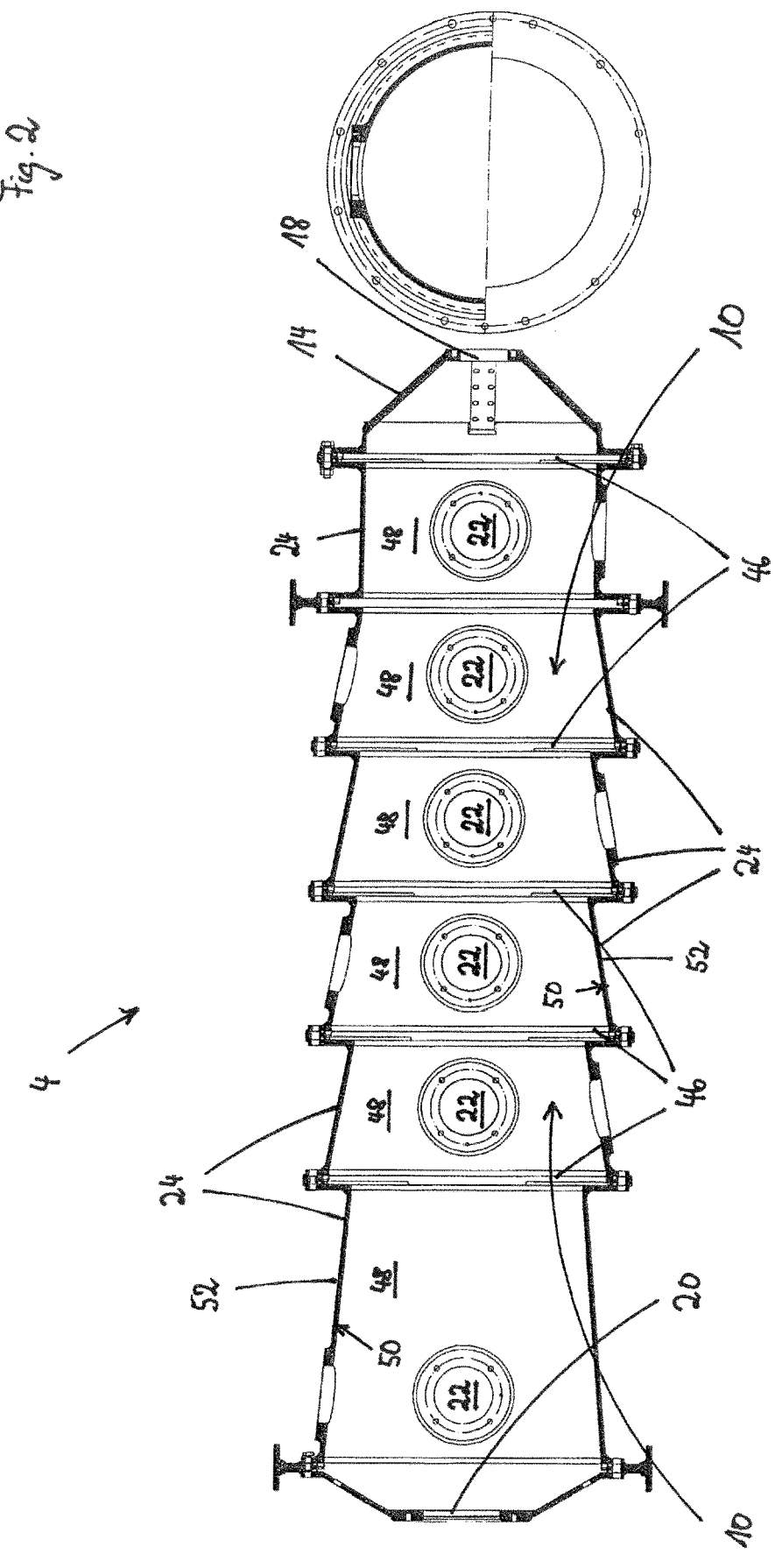
FIG. 2: a section view of the drum illustrated in FIG. 1.

In FIG. 2, a section view of the drum 4 illustrated in FIG. 1 is shown. In the section view a total of six partitions 46 can be seen that divide the milling chamber 10 into seven sections 48. In each of the sections 48, grinding media can be arranged wherein the number, the weight, the shape, and the size of the grinding media can vary between the individual sections 48. The selection of the grinding media to be respectively introduced into a section 48 has an effect on the decomposition of the biological raw materials, the dissociation of the natural rubber from the biological raw materials as well as on the agglomeration of this natural rubber.

The section illustration illustrated in FIG. 2 shows that the inner surfaces 50 of the outer walls 52 are not embodied plane-parallel to the axis of rotation 6 but comprise a conical basic shape. By means of the setting angle of the outer walls 52 or of the inner surfaces 50 relative to the axis of rotation 6, it is possible to affect as a whole the flow rate of the material mixture to be ground through the sections 48 and the milling chamber 10. While the wall with the inner surface 50 of the first pipe segment 24 comprises a setting angle relative to the axis of rotation 6 of 85 degrees, the inner surface 50 of the second pipe segment 24 is positioned at a setting angle of 79.5 degrees. Of course, also setting angles deviating therefrom can be selected. Also other non-cylindrical basic shapes of the pipe segments 24 can be selected. The pipe segments 24 have in this context a suitable length in order to be able to perform a suitable processing of the vegetable feedstock in the corresponding section 48. The number, the length, the diameter, the shape of the pipe segments that are assembled to a drum 4 can be suitably designed and selected by a person of skill in the art.

The flange surfaces 26 of the pipe segments 24 can be connected to each other by connection elements such as, for example, a number of screws with lock nuts or stud bolts.

In the section illustration of FIG. 2, it can be seen well that the milling chamber 10 comprises a conically tapering constriction toward the discharge device 18 in the region of the second end face 14 and thus at its end positioned downstream.

The illustrated constriction is well suited to skim off the flakes of agglomerated natural rubber floating up to the surface of the material mixture to be ground. The discharge can be realized in that either a material mixture to be ground is increasingly supplied to the milling chamber 10 whereby a flushing impulse in the milling chamber 10 is generated and/or the axis of rotation 6 of the drum 4 at the feed side end is lifted and/or lowered at the discharge-side end, whereby then the flakes are flushed out of the milling chamber 10 without in this context higher proportions of the remainder of the vegetable feedstock being flushed out. The fraction of the material mixture to be ground that no longer contains a noteworthy quantity of natural rubber can subsequently be discharged from the last section 48 wherein then the respective fractions can be separated by the discharge device 18 in that they are conveyed into different discharge containers. It is of course also possible to discharge the material mixture to be ground as a whole from the milling chamber 10 without separately skimming off the agglomerated natural rubber by means of the grinding media mill 2.

Figure 3:
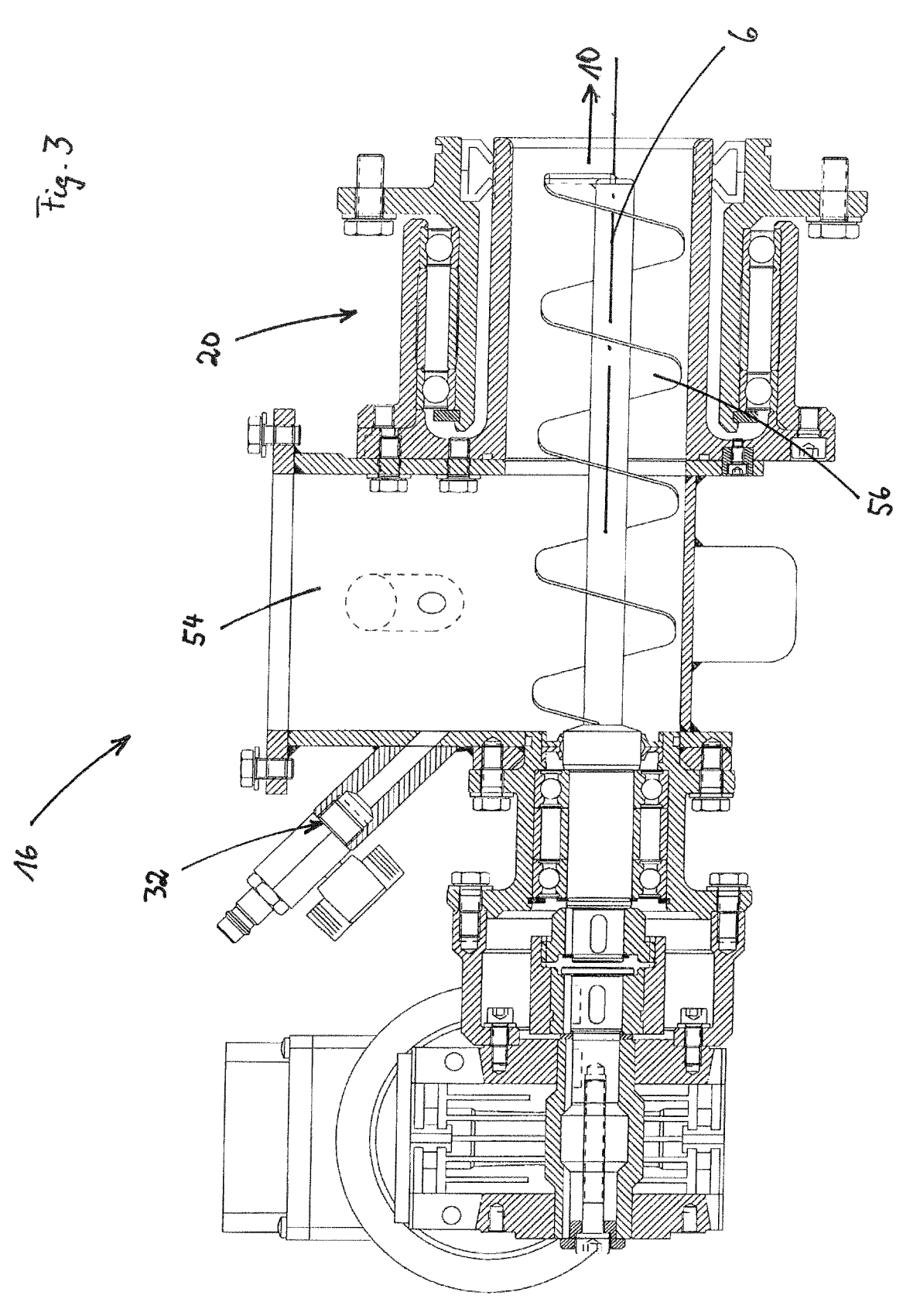
FIG. 3: an enlarged detail view of a feed device.

FIG. 3 shows an enlarged section view of the feed device 16. For supplying the material mixture to be ground, the feed device 16 comprises a connection socket 54 to which the feed container 30 can be connected. In the region of the connection socket 54, there is also the feed conduit 32. In the feed device 16, there is a screw conveyor as a drivable forced feed action 56 which passes through the rotary feedthrough 20 and conveys the material mixture to be ground supplied by the connection socket 54 into the milling chamber 10. The augers of the screw conveyor force the vegetable feedstock reliably into the milling chamber 10. They prevent at the same time that grinding media that are moved upon rotation of the drum 4 in the milling chamber 10 can pass into the feed device 16. Also, a return flow of the material mixture to be ground into the feed device 16 is prevented by the forced feed action 56. The forced feed action 56 is arranged coaxial to the axis of rotation 6 of the drum 4.

Figure 4:
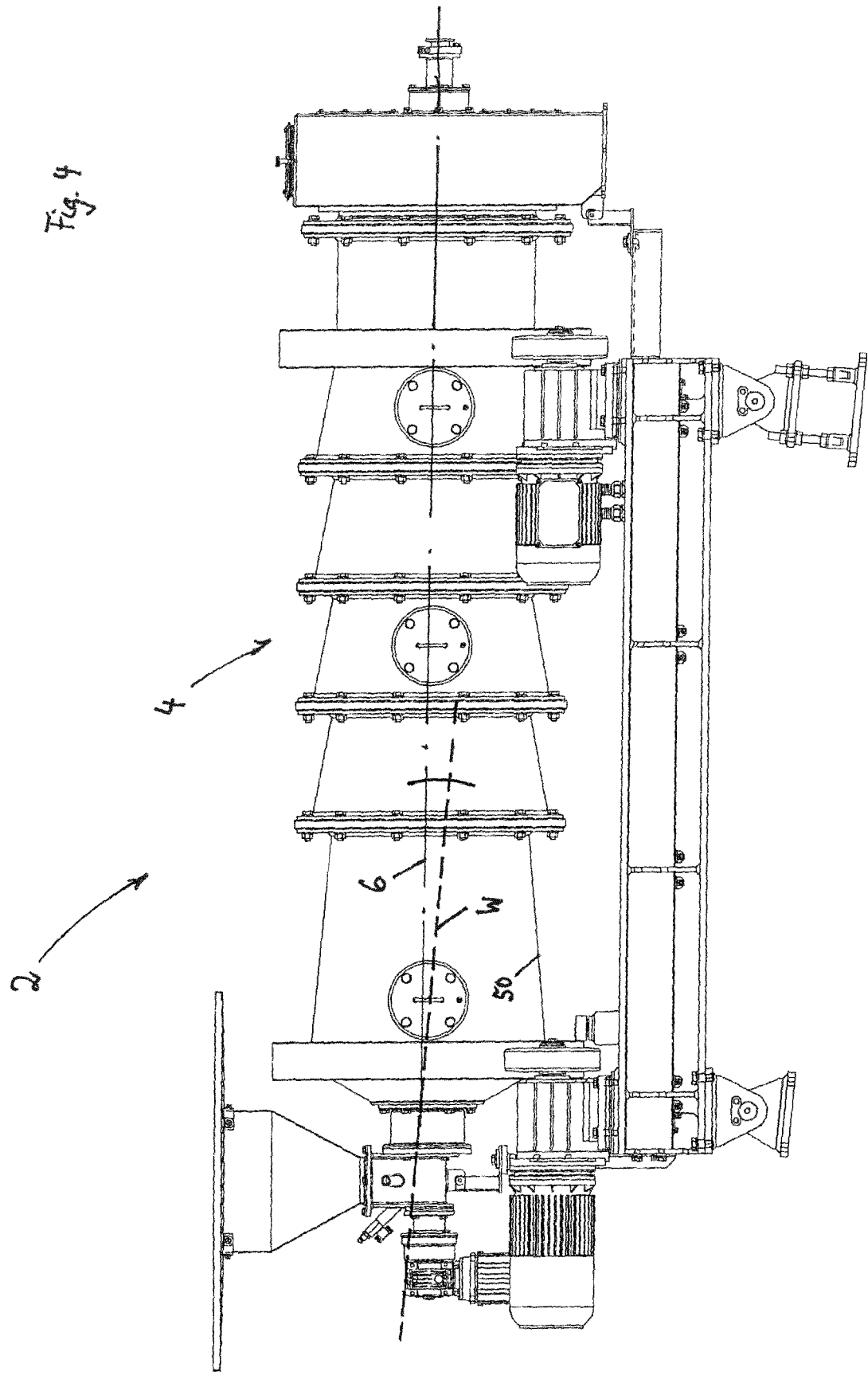
FIG. 4: a view of a drum with an ascending axis of rotation.

FIG. 4 shows a grinding media mill 2 in which the axis of rotation 6 of the drum 4 is lifted relative to the horizontal W. Since in this way also the inner surfaces 50 of the pipe segments 24 ascend in the conveying direction along the axis of rotation 6 toward the right relative to the horizontal W, the conveying speed with which the material mixture to be ground flows through the milling chamber 10 is naturally reduced in such an angle position of the drum 4. In reverse, it is conceivable that, for an angle position of the axis of rotation 6 in which the latter descends in conveying direction relative to the horizontal, the conveying speed of the material mixture to be ground through the milling chamber 10 is increased. In the embodiment, the drum 4 is held on a frame that, in turn, is supported by rotary bearings on the ground. For changing the spatial position of the axis of rotation 6, mechanical adjusting means can be provided but it is also possible to lift or lower the frame at one or both sides by motor-driven actuators such as, for example, a lifting cylinder.

Figure 5:
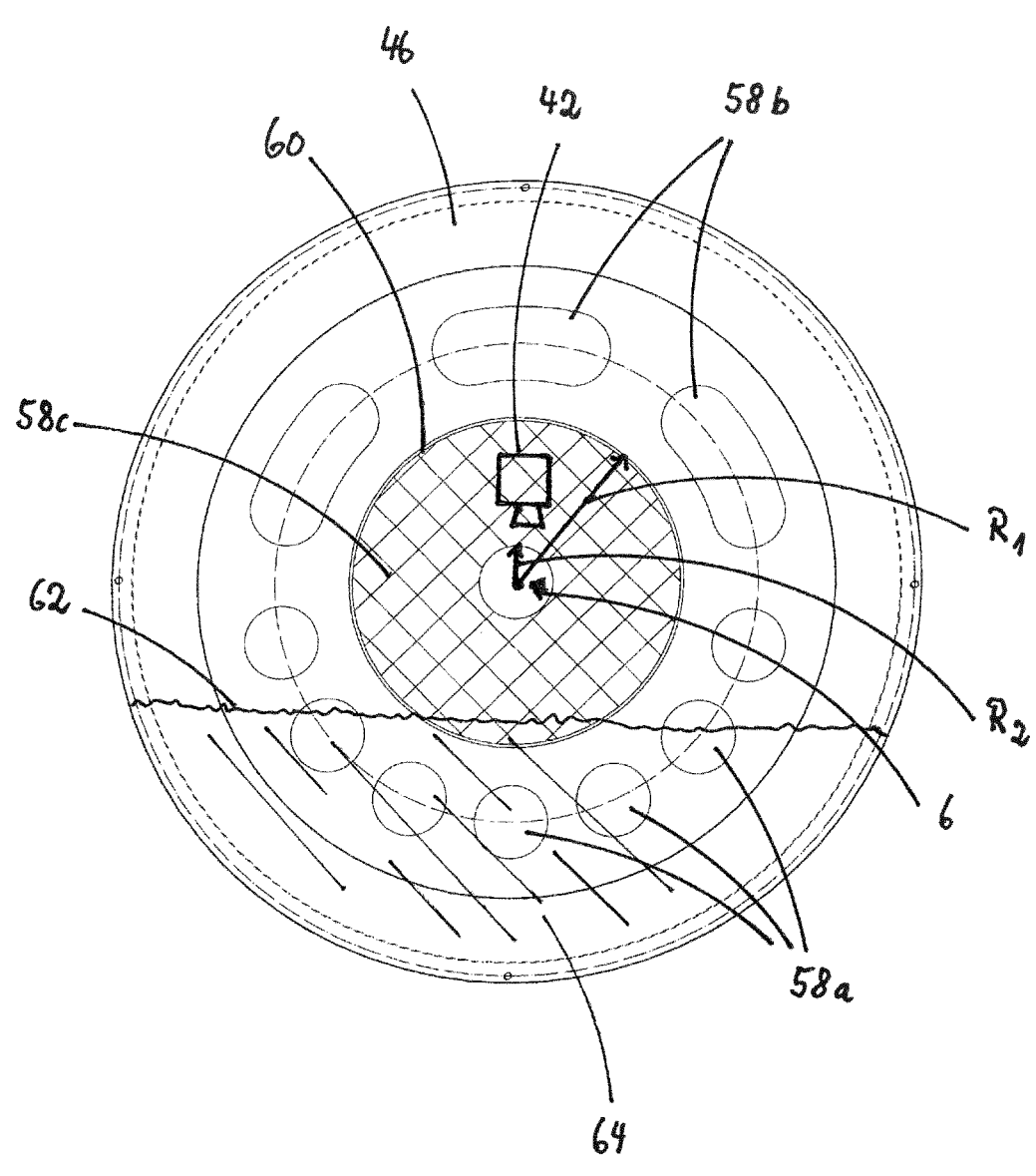
FIG. 5: a view of a partition.

In FIG. 5, an end face view of a partition 46 is illustrated. The partition 46 comprises a number of passage openings 58 through which the material mixture to be ground can flow from one section 48 to the neighboring downstream section 48. In the embodiment illustrated in FIG. 5, the passage openings 58*a*, 58*b*, and 58*c* have different shapes and sizes. While the passage openings 58*a* in regard to their shape and size are sized such that they retain the grinding media contained in a section, the passage openings 58*b* are sized in regard to their shape and size such that through them grinding media can also pass into a neighboring section.

The partition 46 illustrated in FIG. 5 has the passage opening 58*c* embodied as a cutout 60 whose radius $R_1$ in at least one part of the circular arc covered by the cutout 60 is larger than the outer circumference of the axis of rotation 6 determined by the radius $R_2$ in the region of the corresponding partition 46. In the embodiment illustrated in FIG. 5 of a partition 46, the cutout 60 is provided with a grid in order to avoid passage of grinding media. When however the grid illustrated in FIG. 5, in deviation from the embodiment, is omitted, it is possible to move sensors 42 along the axis of rotation 6 through one or a plurality of sections 48. In FIG. 5, it can be seen that the camera as sensor 42 is arranged adjacent to the axis of rotation 6 in the milling chamber 10. In case of a fill of the milling chamber 10 with material mixture to be ground 64, indicated by the wavy line 62, the sensor 42 is arranged at a distance to the material mixture to be ground 64 at which damage or soiling of the sensor 42 is hardly probable.

Figure 6:
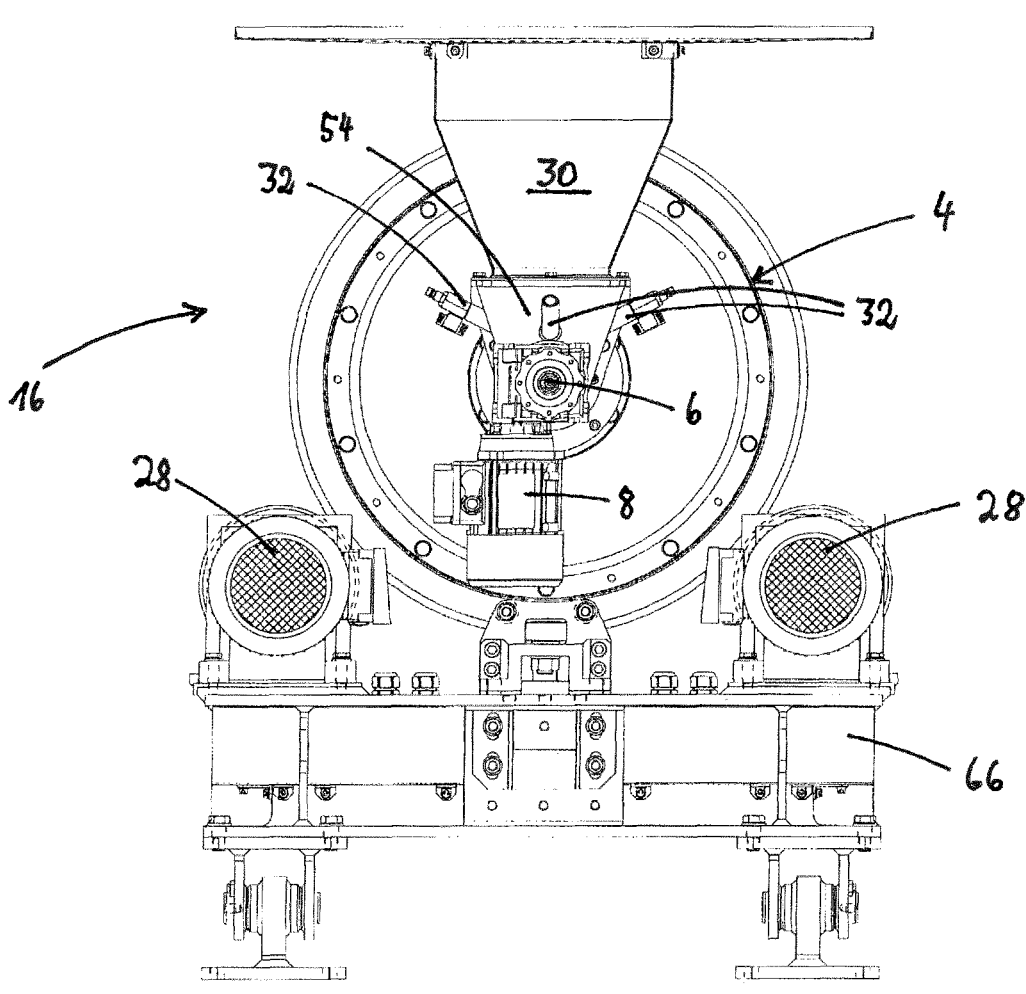
FIG. 6: a view of the feed side of the grinding media mill.

In FIG. 6, a view of the feed side of the grinding media mill 2 is illustrated. In this view, the round circumferential shape of the drum 4 can be seen well. Also, the feed device 16 with the funnel-shaped feed container 30, the connection socket 54 arranged underneath, as well as the plurality of feed conduits 32 can be seen. In the end view, the axis of rotation 6 can be seen also wherein the axis of rotation 6 here illustrates the rotary bearing of the forced feed action 56 that is driven by a separate motor 8. In this view, it can also be seen well that the drum 4 is held by the rollers on the frame 66.

Figure 7:
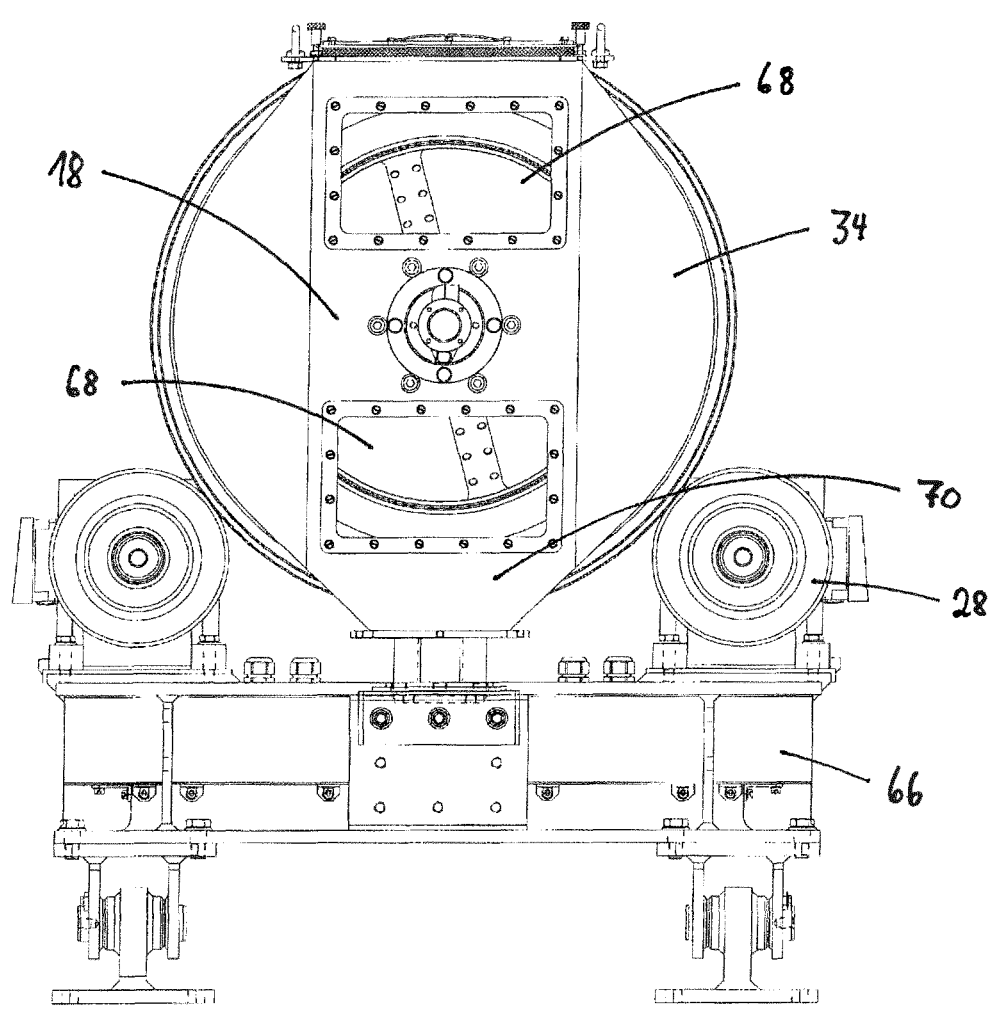
FIG. 7: a view of the discharge side of the grinding media mill.

In FIG. 7, a view of the discharge side of the grinding media mill 2 is illustrated.

In this view, the control ports 68 can be seen that are provided in the end wall 34 in order to be able to visually check through the control ports whether the natural rubber contained in the biological raw materials has agglomerated to flakes in the last section 48 of the milling chamber 10.

The material mixture to be ground 64 discharged through the discharge device 18 from the milling chamber 10 can be further conveyed via a discharge socket 70 to downstream separating and cleaning devices.

Figure 8:
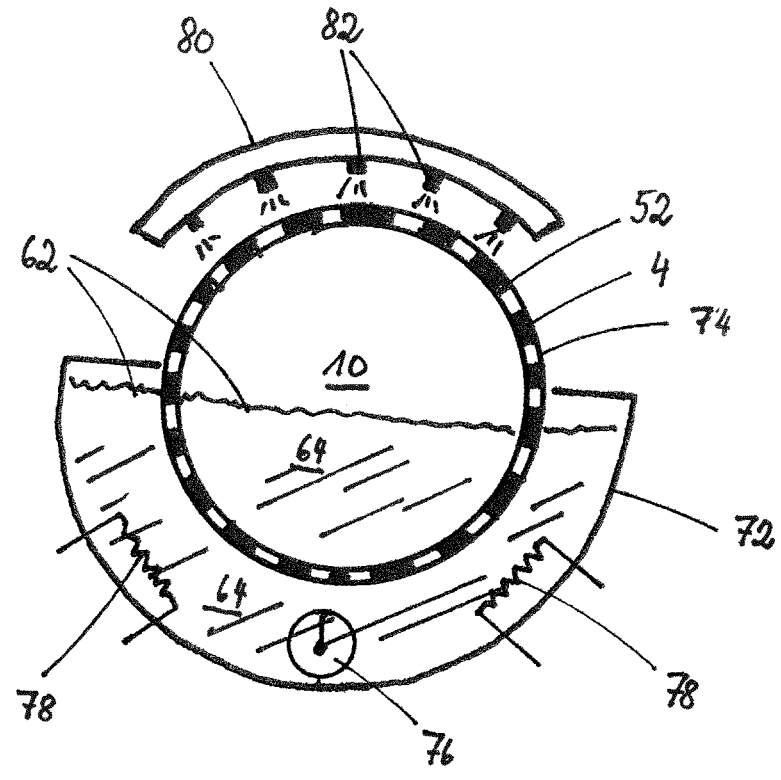
FIG. 8: a cross section view of the drum with a receiving chamber.

In FIG. 8, a cross section view of a drum 4 with a receiving chamber 72 is illustrated. The outer wall 52 of the drum 4 in the embodiment is designed as a perforated metal plate so that the material mixture to be ground 64 can pass from the milling chamber 10 in the interior of the drum 4 through the openings 74 in the perforated metal plate outwardly into the receiving chamber 72. The openings 74 can be designed such that grinding media from the milling chamber 10 can pass through them into the receiving chamber 72, or they are designed such that this is prevented. The receiving chamber 72 can be utilized to wash, to boil the vegetable feedstock contained in the material mixture to be ground 64 and/or to separate and discharge components of the material mixture to be ground 64. For this purpose, corresponding process tools can be arranged in the receiving chamber 72. In the embodiment, a screw conveyor 76 is illustrated with which the sediment that collects at the bottom of the receiving chamber 72 can be discharged. Furthermore, heaters 78 are illustrated with which the material mixture to be ground 64 can be heated, for example, in order to boil it.

Above the drum 4, there is furthermore a jacket 80 illustrated in FIG. 8 which surrounds the circumference of the drum 4 partially and at which nozzles 82 are arranged. By means of the nozzles 82, a liquid, a gas or hot steam can be injected into the milling chamber 10 from the exterior through the openings 74 in the outer wall 52 of the drum 4. In the jacket 80, also metering means for adding solids into the milling chamber can be provided, which solids are added to the material mixture to be ground in order to assist in dissociation and separation of the polyisoprenes and other apolar materials that are released upon processing.

Figure 9:
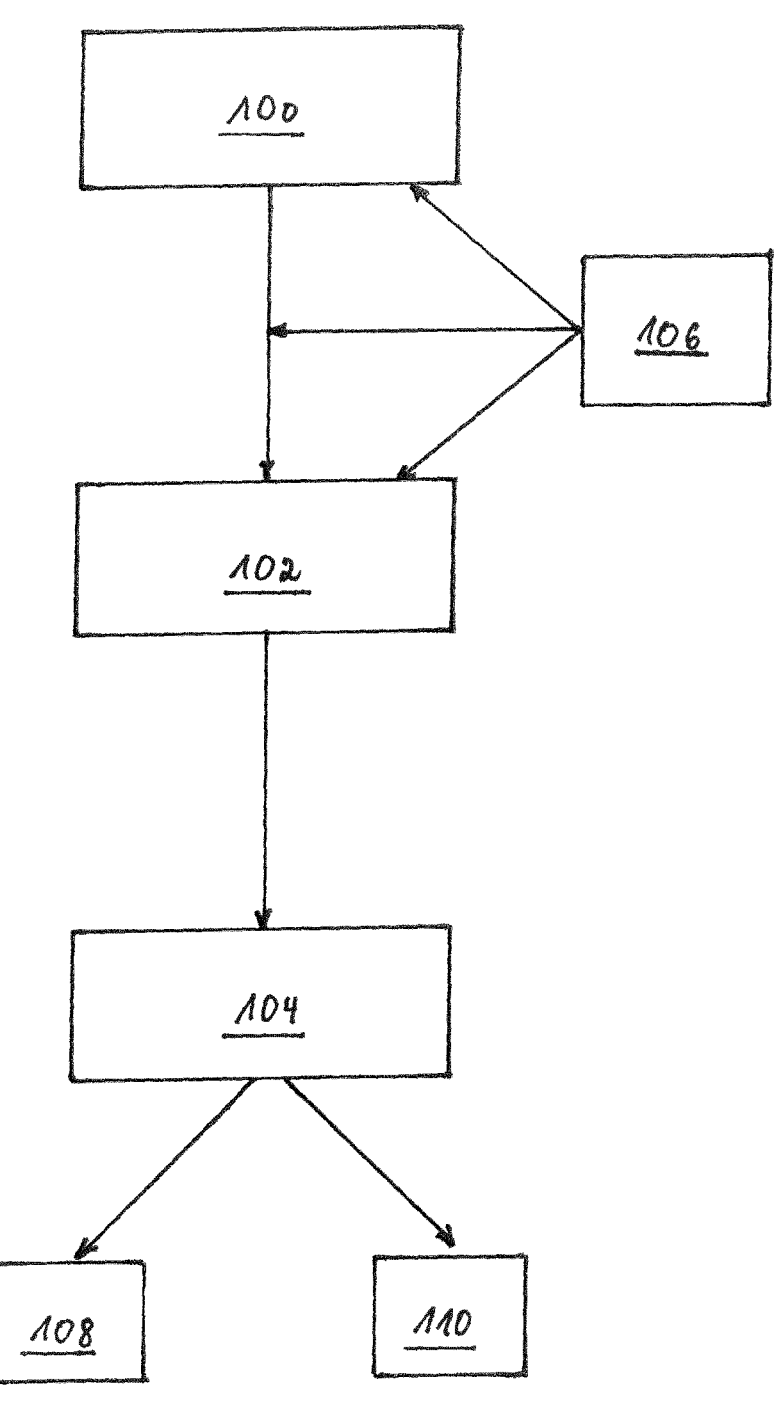
FIG. 9: a method flowchart.

FIG. 9 shows a method flowchart. In the first pretreatment 100, the vegetable feedstock is prepared and pre-processed for the subsequent method step. After the pretreatment 100, mechanical processing 102 of the vegetable feedstock is carried out. In this context, the vegetable feedstock is subjected in a wet phase to a percussive, cutting and/or rubbing mechanical processing. The mechanical processing 102 can be realized, for example, in a grinding media mill 2 as described above. In order to be able to better separate the natural rubber upon separation in the method step 104 from the remainder of the material mixture to be ground, an adsorber material 106 is added to the material mixture to be ground prior to or during the mechanical processing 102. The adsorber material 106 can be added to the vegetable feedstock already prior to or during the pretreatment 100; the addition is realized after pretreatment 100 but prior to mechanical processing 102; or the adsorber material 106 is added to the material mixture to be ground during the mechanical processing. The natural rubber that is extracted from the vegetable feedstock by the mechanical processing 102 in the liquid phase of the material mixture to be ground attaches to the adsorber material 106. Upon separation 104, the adsorber material 106 together with the adhering natural rubber from the vegetable feedstock can be separated as batch 108 from the remainder 110 of the material mixture to be ground for further processing.

The invention is not limited to the afore described embodiments.

What is claimed is:

1. A method of obtaining polyisoprene from vegetable feedstock, the method comprising:
    pretreating the vegetable feedstock by boiling, washing, comminuting and/or a chemical and/or biological decomposition;
    subsequently, mechanically processing the vegetable feedstock in a wet phase by percussive action, by cutting and/or by rubbing to extract the polyisoprene contained in the processed vegetable feedstock from the vegetable feedstock;
    prior to or during mechanically processing in the wet phase, adding an adsorber material to the vegetable feedstock;

adsorbing the polyisoprene that has been extracted in the
    wet phase on the adsorber material; and
separating the polyisoprene and the adsorber material
    from the wet phase.

2. The method according to claim 1, further comprising
using a grinding media mill operated in continuous opera-
tion in the step of mechanically processing.

3. The method according to claim 2, wherein the adsorber
material is a solid adsorber material or a liquid adsorber
material, wherein the adsorber material is an apolar
adsorber.

4. The method according to claim 3, further comprising
supplying continuously the solid adsorber material and/or
the liquid adsorber material to a milling chamber of the
grinding media mill.

5. The method according to claim 1, further comprising
employing mechanical separation in the step of separating to
remove the polyisoprene and the adsorber material from the
wet phase.

6. The method according to claim 1, further comprising
using a grinding media mill in the step of mechanically
processing in the wet phase.

*   *   *   *   *